Aug. 21, 1956     K. A. DOUTT     2,759,367
MECHANICAL MOVEMENT
Filed June 29, 1954     3 Sheets-Sheet 1

INVENTOR.
KINGSLEY A. DOUTT
BY
W. B. Harpman
ATTORNEY

Aug. 21, 1956

K. A. DOUTT 2,759,367

MECHANICAL MOVEMENT

Filed June 29, 1954.

INVENTOR.
KINGSLEY A. DOUTT
BY
W. B. Harpman
ATTORNEY

Aug. 21, 1956 K. A. DOUTT 2,759,367
MECHANICAL MOVEMENT
Filed June 29, 1954 3 Sheets-Sheet 3
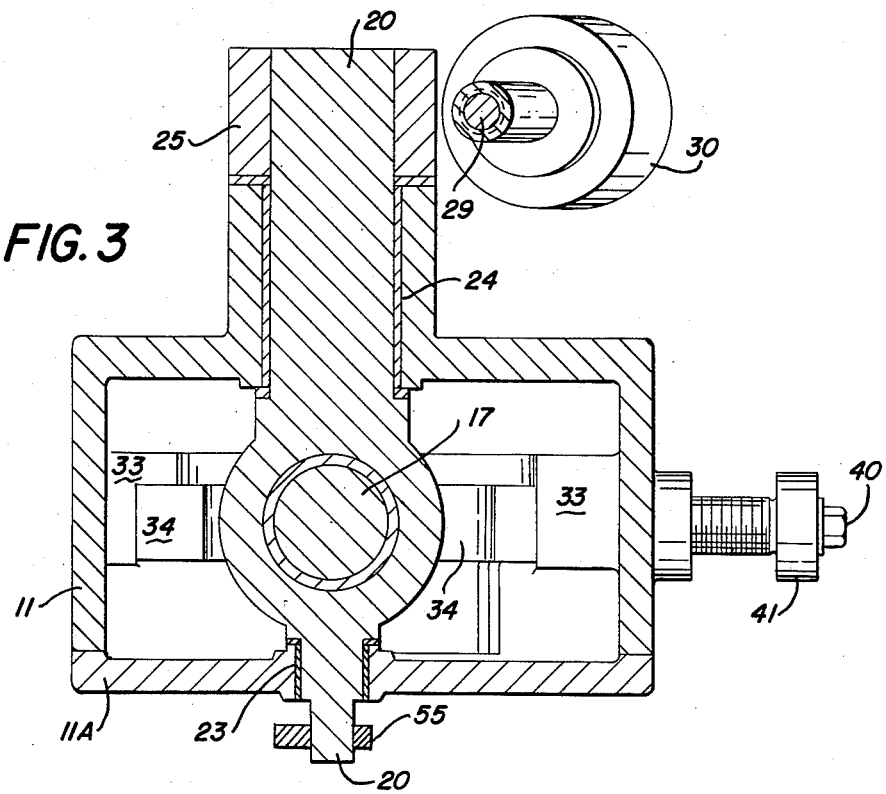
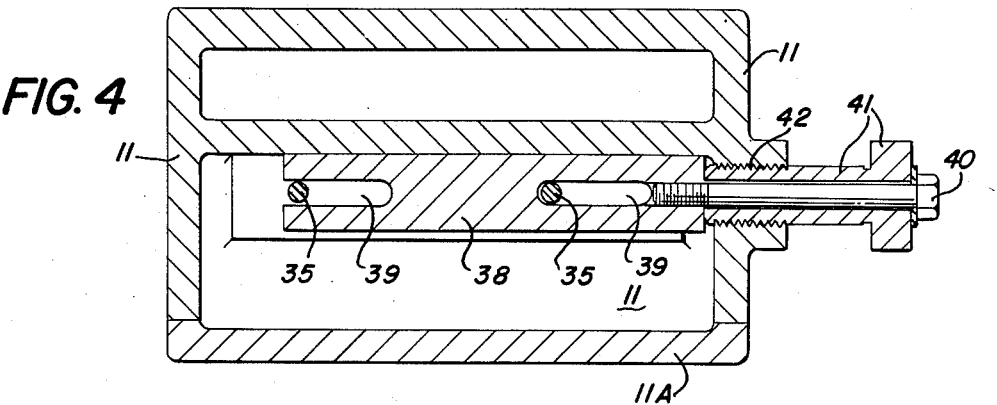
INVENTOR.
KINGSLEY A. DOUTT
BY
*W. B. Harpman*
ATTORNEY United States Patent Office 2,759,367
Patented Aug. 21, 1956

2,759,367

MECHANICAL MOVEMENT

Kingsley A. Doutt, Alpena, Mich.

Application June 29, 1954, Serial No. 439,993

4 Claims. (Cl. 74—99)

This invention relates to a mechanical movement and more particularly to a mechanical movement for imparting controlled motion to the movable platen of a flash welding machine.

Flash welding machines as known in the art comprise essentially an insulated normally fixed platen having an electrode and means to secure a workpiece thereto and a movable platen which includes an electrode and workpiece securing means. The movable platen is applied for sliding movement toward and away from the fixed platen and means is employed for imparting such movement thereto.

In the present disclosure, a simple mechanical movement including a pivoted rocker arm including a cam carrying slide piece is arranged to receive uniform movement from a power source and transform such movement to a suitable platen motion for operating a flash welding machine.

The mechanical movement disclosed herein comprises a continuation-in-part of my co-pending patent application on Mechanical Movement Serial No. 261,553, filed December 13, 1951, now Patent No. 2,689,482, wherein a similar mechanical movement for a flash welding is disclosed.

The present disclosure differs from the disclosure of my said co-pending application principally in a simplification of the structure controlling and positioning the cam carrying slide piece with respect to the pivoted rocker arm. In the co-pending application an arcuate guide 33 is mounted by a cam 32 for movement therealong whereas in the present disclosure a cam is moved toward and away from the rocker arm (rather than transversely with respect thereto) by a slide piece in the form of a wedge-shaped member which comprises a simpler, more efficient construction and which simplifies the gauging indicia desirable in connection therewith.

Those skilled in the art will recognize that by imparting a desirable movement to the platen of a flash welding machine, an improved welding technique will result.

The principal object of the invention is the provision of a mechanical movement operating to impart a most desirable welding cycle movement and control to the movable platen of the flash welding machine regardless of the conditions affecting the movable platen and variations in the workpieces such as size, thickness, material, shape, etc.

A further object of the invention is the provision of a mechanical movement for a flash welding machine arranged to perform a complete welding cycle from flashing to upsetting with no hesitation in the controlled and timed advance of the movable platen and operating in effect to superimpose upsetting action on a continuing flashing action.

A still further object of the invention is the provision of a mechanical movement for imparting desirable motion to the movable platen of a flash welding machine and wherein the movement of the platen during the flashing and upset cycles is responsive only to the mechanical movement.

A still further object of the invention is the attainment of a wider diversity and greater accuracy in the control of the variables making up a flash welding operation through the use of an improved mechanical movement. For example, the pattern of the rate of change of the movable platen during the flashing action may be readily varied with respect to time and the interval between the initiation of flashing and the start of the upsetting. Such variable factors enable a higher degree of control over the welding operation to be achieved and thereby contribute considerably to the quality of the work performed.

A still further object of the invention is the provision of a mechanical movement capable of acting as a welding control to facilitate and simplify the setting up of a welding machine to perform a particular welding operation especially when the operation is to be repeated under automatic control.

The invention therefore comprises an improved mechanical movement for readily changing the pattern of movement of the movable platen of a flash welding machine during the flashing and upsetting portions of the welding cycle, the device being so arranged that regardless of the adjustments made, a complete cycling of the flash welding machine always occurs.

A still further object of the invention is the provision of a mechanical movement capable of controlling the movable platen of a flash welding machine and which movement may be simply and economically formed and which may be employed with any flash welding machine to operate the same effectively and which apparatus may be made at relatively low cost.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 3 is a horizontal section taken on line 3—3 of Figure 1.

Figure 4 is a horizontal section taken on line 4—4 of Figure 1.

Figure 1:
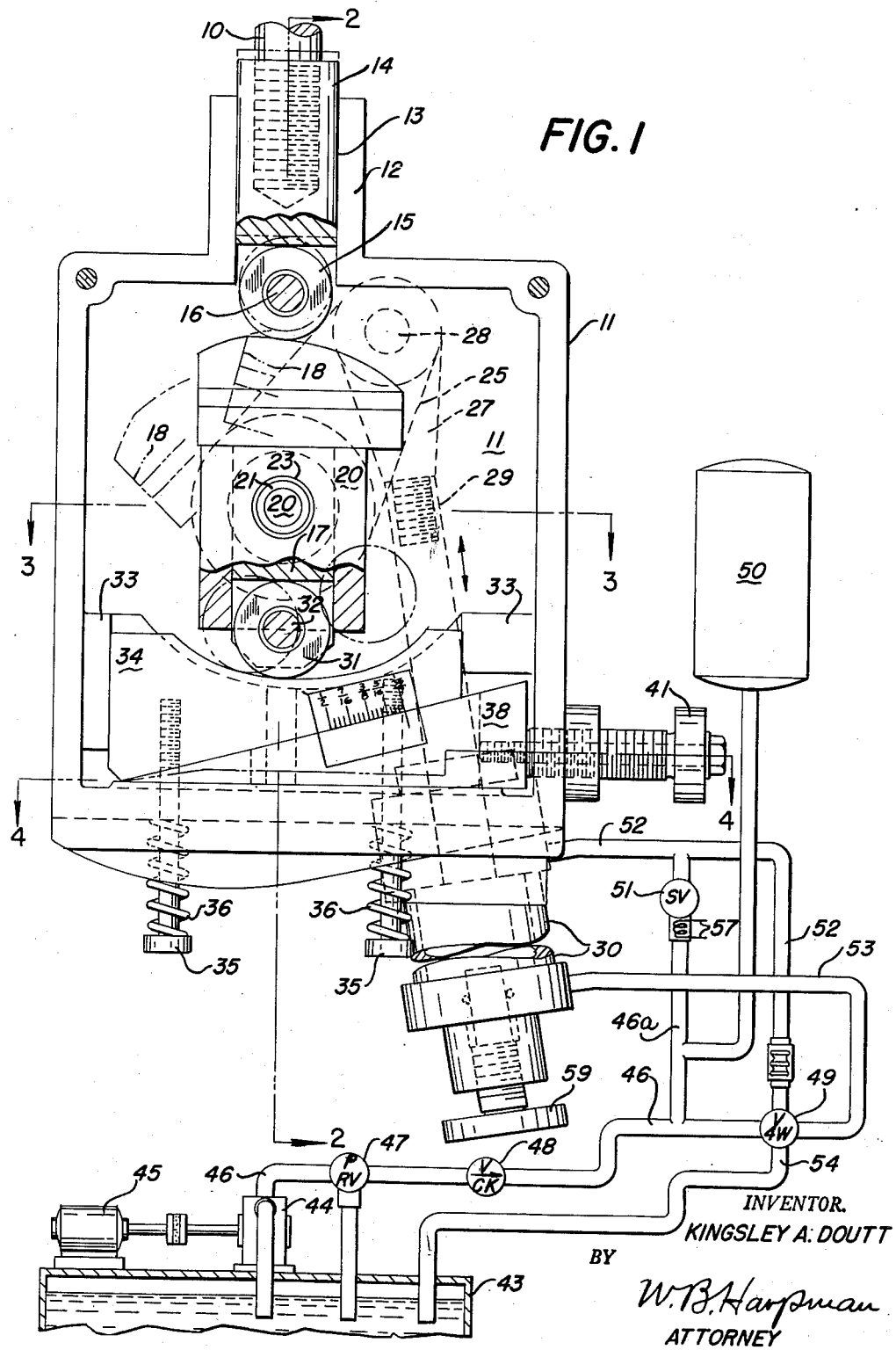
Figure 1 is a top plan view of the improved flash welder controlling mechanical movement.

By referring to the drawings and Figure 1 in particular it will be seen that the flash welding controlling mechanical movement comprises a relatively small and compact device which may be attached to a flash welding machine by bolting the same thereto at a point thereon adjacent the movable platen and connecting the movable platen thereto, as shown in Figure 1 of the drawings, by a connecting member 10.

The device comprises a frame 11, the major portion of which is formed as a housing and including an extension 12 defining a guide-way 13 for a roller slide 14 which threadably receives the connecting member 10 of the movable platen of the flash welder. The roller slide 14 has a roller 15 on its inner end within the area of the frame and housing 11, the roller 15 being mounted on a pin 16 positioned in a bifurcated end structure of the roller slide 14.

Positioned in longitudinal alignment with the roller slide 14 there is a cam and roller slide 17 having a cam 18 on its outermost end and in engagement with the roller 15 heretofore referred to. The cam and roller slide 17 is slidably mounted in a sleeve 19 which in turn is positioned transversely of a shaft 20. The shaft 20 is journaled in bushings 21 and 22, respectively, in oppositely disposed openings 23 and 24 in the frame and housing 11. The cam and roller slide 17 is thus movable transversely of the shaft 20 and the shaft 20 is rotatable on its axis in the housing 11. A crank arm 25 is formed on one end of the shaft 20 and is bifurcated as at 26—26 to receive an apertured end 27 therebetween which is pivoted thereto by a pivot pin 28 registering in apertures in the bifurcated ends 26 of the crank arm 25.

The apertured end 27 is positioned on a piston rod 29 which is part of a hydraulic piston and cylinder assembly, the cylinder portion of which is indicated by the numeral 30 and which provides for imparting rotating motion to the shaft 20 as hereinafter more fully set forth.

Figure 2:
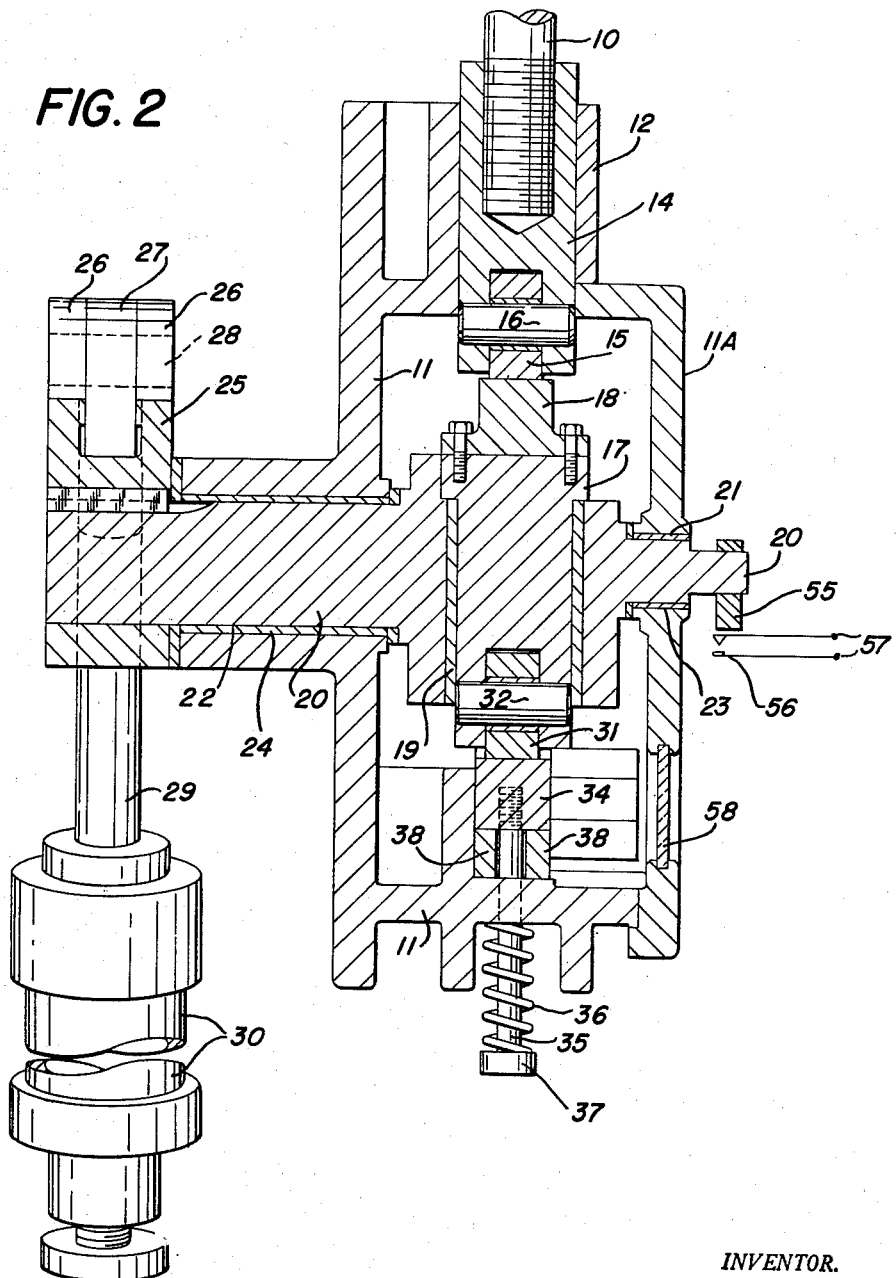
Figure 2 is a vertical section taken on line 2—2 of Figure 1.

The cam and roller slide 17 has a secondary roller 31 positioned on its end opposite to the end carrying the cam 18 and which secondary roller 31 is positioned between bifurcated ends of the cam and roller slide 17 by a pivot pin 32 (see Figure 2 of the drawings).

By referring again to Figure 1 of the drawings, it will be seen that the lower portion of the frame and housing 11 has oppositely disposed guide-ways 33—33 formed therein for guiding a cam block 34 toward and away from the secondary roller 31 just referred to. The cam block 34 has an arcuate cam formed in its surface adjacent the secondary roller 31 and on which cam surface of the cam block 34 the roller 31 is adapted to be engaged. The cam block 34 is normally spring biased away from the roller 31 on the cam and roller slide 17 by a pair of adjustable devices comprising bolts 35—35 having coil springs 36—36 positioned therearound. The bolts 35—35 pass through openings in the frame and housing 11 and threadably engage the cam block 34 and the coil springs 36 are positioned between heads 37 on the bolts 35 and the outer surfaces of the frame and housing 11.

Means for moving the cam block 34 toward the roller 31 on the cam and roller slide 17 is positioned between the frame and housing 11 and the cam block 34 and comprises a wedge 38 having slots 39 therein providing clearance for the bolts 35 heretofore referred to. The wedge 38 is positioned for transverse movement within the frame and housing 11 and means for imparting such transverse movement to the wedge 38 is provided and comprises a bolt 40 threadably engaged in one end of the wedge 38 and extending outwardly through the frame and housing 11 and having a longitudinally apertured bolt 41 positioned thereon between the wedge 38 and the head of the bolt 40. The longitudinally apertured bolt 41 is threadably engaged in a threaded opening 42 in the frame and housing 11 so that when rotating movement is imparted to the apertured bolt 41 it moves in or out of the housing 11 imparting such movement to the wedge 38.

It will thus be seen that when the wedge 38 is moved transversely from right to left, as shown in Figures 1 and 4 of the drawings, the resulting action will be to move the cam block 34 toward the roller 31 and on the cam and roller slides 17, while movement of the wedge 38 in the opposite direction from left to right will permit the springs 36 on the bolts 35 to move the cam block 34 away from the roller 31 on the roller and cam slide 17.

Indicia on the cam block 34 and the wedge 38 arranged for respective registry during such motion comprises an indication of the flash travel imparted by the mechanical movement to the platen and flash welder. The cam block 34 having an arcuate cam surface therein, as heretofore described, comprises the means of imparting flashing and upsetting movement to the secondary roller 31 and hence the cam and roller slide 17 whereby it is conveyed through the cam 18 and the roller 15 to the roller slide 14 and hence to the member 10 connecting to the movable platen of the flash welding machine.

Means for rocking the shaft 20 and hence moving the cam and roller slide 17 along the cam in the cam block 34 comprises the piston and cylinder assembly heretofore referred to and is adapted to impart uniform movement to the shaft 20, the movement being accelerated in desirable degree by the compound actions of the secondary roller 31 engaging the cam block 34 and the cam 18 engaging the roller 15.

Dotted lines in Figure 1 indicate several positions of the cam and roller slide 17 during the partial rotation of the shaft 20 by the piston and cylinder assembly 30.

Those skilled in the art will observe that a desirable flashing and upsetting action can thereby be imparted to the movable platen of the flash welder machine due to the multiple action based on the uniform movement of the piston and cylinder assembly 30.

Still referring to Figure 1 of the drawings it will be seen that means is provided for delivering hydraulic fluid to the piston and cylinder assembly 30 and such means comprises a reservoir 43 having a supply of hydraulic fluid therein and carrying a pump 44 and an energizing motor 45. The pump 44 supplies hydraulic fluid under pressure to a pipe 46 where it flows through a pressure reducing valve 47 which also communicates with the reservoir 43, a check valve 48 and to a four-way valve 49.

A pressure accumulator 50 is in communication with the pipe 46 and a by-pass 46A leads to a solenoid valve 51. Pipes 52 and 53 connect the four-way valve 49 with the opposite ends of the hydraulic cylinder 30 and a return line 54 connects the four-way valve 49 with the reservoir 43.

The hydraulic arrangement is conventional and it will occur to those skilled in the art that when the pump 44 is energized and the four-way valve 49 is desirably positioned, fluid will flow into the hydraulic cylinder 30 and move the piston inwardly and outwardly thereof, as desired, in a uniform motion. Such uniform motion is translated by the cam and roller slides 17 gauging the cam block 34 and imparting the resulting movement through the cam 18 to the platen connecting member 10 to achieve the objects of the invention.

In normal operation, the solenoid valve 51 is closed and operation of the pump 44 moves hydraulic fluid through the line 46, including the four-way valve 49, to the hydraulic cylinder 30. At such time as the shaft 20 turns and reaches a predetermined position and the roller 15 engages the cam 18, and cam disc 55 on a stub extension of the shaft 20 (see Figure 2 of the drawings) engages a switch 56 and closes the same which in turn controls the solenoid valve 51 by way of circuit wires 57. Upon the actuation of the solenoid valve 51, the hydraulic pressure in the accumulator 50 and the direct output of the pump 44 flows by way of the pipes 46 and 46A directly into the pipe 52 adjacent the cylinder 30 and accumulates the motion of the piston rod 59 providing an additive motion with respect to the engagement of the roller 15 on the cam 18, thereby facilitating the upset action and provide a perfect weld.

It will thus be seen that a variable non-uniform movement is imparted to the cam and roller slide 17 from the combined actions of the cams 34 and 18. The variable non-uniform movement results from two sources, the first being; the engagement of the secondary roller 31 against the cam block 34 resulting from such engagement moves the cam and roller slide 17 transversely of the shaft 20 and in turn moves the cam 18 toward the roller 15 which is normally engaged thereagainst. The cam 18 is also adding movement to the cam and roller slide 17 as it is moving in a different transverse direction with respect to the roller 15 as it is on the opposite side of the vertical axis of the horizontal axis of the shaft 20.

In actual operation, the secondary roller 31 initially engages the cam surface in the cam block 34 and provides a progressively increasing flashing action of the platen. The movement of the roller 15 engaging the cam 18 is super-imposed upon the initial movement and comprises the upset cycle motion imparted to the movable platen of a flash welder.

It will thus be seen that the actuation of the mechanical movement is dependent upon the action of the hydraulic piston and cylinder assembly in that uniform movement of the piston 29 in the cylinder 30 is imparted to the shaft 20 with the resulting progressively increasing motion, as just described.

At such time as the shaft 20 revolves sufficiently to bring the cam disc 55 into engagement with the switch 56, the solenoid valve 51 opens and increases the hydraulic pressure in the cylinder 30 and thereby adds the same to the motion obtained from the cams with a resulting highly desirable upsetting action being superimposed upon the flashing movement.

The operation of the improved mechanical movement disclosed herein is thus similar in most respects to that shown in my aforesaid Patent 2,689,482 with the exception that the adjustment of the cam block 34 is simplified and its presentation to the roller rendered more uniform by the arrangement of the parts of the mechanical movement disclosed herein.

Those skilled in the art will recognize that means is provided in the flash welder operated by the device for returning the several parts to their normal position from whence the device may recycle to complete another welding and upsetting action.

By referring to Figures 1 through 4 of the drawings it will be observed that the frame 11 forms the bottom and side walls of a housing with respect to the shaft 20, cam and roller slide 17 and the cam block 34 and wedge 38. A closure 11A forms the top of the enclosure. The openings 23 and 24 heretofore referred to as forming the pivotal bearings of the shaft 20 are formed one in the closure 11A and one in the bottom of the frame 11 in vertical alignment.

It will further be observed that the closure 11A has a window 58 therein so that indicia on the cam block 34 and wedge 38 may be viewed therethrough.

It will further occur to those skilled in the art that the flash welder actuated by the mechanical movement herein disclosed may be easily and simply reset for various types of workpieces by the manual adjustment of the wedge 38 by the hollow bolt 41 and by resetting the bottoming adjustment member 59 in the hydraulic cylinder 30. The adjustment of the wedge 38 by the hollow bolt 41 regulates the flashing travel as indicated by the scale forming the indicia on the frame 34 and wedge 38. Such adjustments enable many and various proportionate flashing and upset periods of a welding cycle to be achieved.

It will thus be seen that the several objects of the invention are met by the mechanical movement disclosed herein.

Having thus described my invention, what I claim is:

1. A mechanical movement comprising in combination a roller slide, a roller on said slide, a movable shaft positioned cross-wise and endwise with respect thereto and having a cam and roller slide reciprocally positioned transversely thereof in endwise relation to said roller slide, a cam on one end of said cam and roller slide engaging said roller slide, a secondary roller on the other end of said cam and roller slide, an arcuate cam block positioned for movement toward and away from said secondary roller and means for moving said arcuate cam block toward and away from said secondary roller, said means comprising a wedge movable transversely of said arcuate cam block and means for imparting oscillating movement to said shaft to move said secondary roller against said arcuate cam block and move said cam against said roller.

2. The mechanical movement set forth in claim 1 and wherein the means for moving the arcuate cam block toward and away from said secondary roller includes a transverse guide positioned in spaced relation to said arcuate cam block, said wedge positioned on said transverse guide in engagement with said arcuate cam block and means for moving said wedge along said transverse guide.

3. The mechanical movement set forth in claim 1 wherein the means for urging said arcuate cam block toward and away from said secondary roller includes spring means on said guide, biasing said arcuate cam block away from said secondary roller.

4. The mechanical movement set forth in claim 1 wherein the shaft is journaled in oppositely disposed spaced openings in a housing and the cam block is disposed in said housing, and wedge is positioned between a wall of said housing and said cam block for imparting movement to said cam block toward said secondary roller and at a right angle to the direction of movement of said wedge.

References Cited in the file of this patent
UNITED STATES PATENTS

| | | |
|---|---|---|
| 2,183,950 | Ackerman | Dec. 19, 1939 |
| 2,213,739 | Martin | Sept. 3, 1940 |
| 2,689,482 | Doutt | Sept. 21, 1954 |